(12) United States Patent
Morgan et al.

(10) Patent No.: US 7,003,912 B1
(45) Date of Patent: Feb. 28, 2006

(54) FISHING ROD WITH SIGNAL DEVICES ACTIVATED BY FISH-BITE FLEXING OF THE FISHING ROD

(76) Inventors: Joseph H. Morgan, P.O. Box 1, Moundsville, WV (US) 26041-0001; Wesley S. Wikert, 3630 Eoff St., Moundsville, WV (US) 26003

( * ) Notice: Subject to any disclaimer, the term of this patent is extended or adjusted under 35 U.S.C. 154(b) by 37 days.

(21) Appl. No.: 10/785,354

(22) Filed: Feb. 24, 2004

Related U.S. Application Data

(63) Continuation-in-part of application No. 10/171,781, filed on Jun. 17, 2002, now abandoned.

(51) Int. Cl.
*A01K 97/12* (2006.01)
*A01K 87/00* (2006.01)

(52) U.S. Cl. .................................. 43/17; 43/16; 43/25
(58) Field of Classification Search .................... 43/16, 43/17, 25
See application file for complete search history.

(56) References Cited

U.S. PATENT DOCUMENTS

| | | | |
|---|---|---|---|
| 2,302,337 A | * | 11/1942 | Mantell .......................... 43/17 |
| 2,579,087 A | | 12/1951 | Organ |
| 3,608,227 A | | 9/1971 | Adams |
| 3,624,689 A | | 11/1971 | Rizzo |
| 3,740,888 A | | 6/1973 | Young, Jr. |
| 4,006,550 A | | 2/1977 | Rizzo |
| 4,026,059 A | * | 5/1977 | Ochs .......................... 43/17.5 |
| 4,051,616 A | * | 10/1977 | Mathauser ...................... 43/17 |
| 4,085,437 A | | 4/1978 | Hrdlicka et al. |
| 4,117,618 A | | 10/1978 | Utsler |
| 4,118,882 A | * | 10/1978 | Gorsky .......................... 43/17 |
| 4,266,217 A | | 5/1981 | Kao et al. |
| 4,276,711 A | * | 7/1981 | Mathauser ...................... 43/17 |
| 4,417,299 A | | 11/1983 | Rupp |
| 4,458,438 A | | 7/1984 | McCulley |
| 4,479,321 A | | 10/1984 | Welstead |
| 4,775,920 A | | 10/1988 | Seibert et al. |
| 5,083,247 A | | 1/1992 | Robinson et al. |
| 5,172,508 A | | 12/1992 | Schmidt et al. |
| 5,228,228 A | * | 7/1993 | Meissner ...................... 43/17 |
| 5,274,943 A | * | 1/1994 | Ratcliffe et al. .............. 43/17 |
| 5,406,735 A | | 4/1995 | Howell |
| 5,738,433 A | | 4/1998 | Sparks |
| 5,797,211 A | | 8/1998 | Bae et al. |
| 5,826,366 A | | 10/1998 | Matibe |
| 6,374,533 B1 | | 4/2002 | Gonzales |
| 2003/0172577 A1 | | 9/2003 | Allen |

* cited by examiner

*Primary Examiner*—Michael J. Carone
*Assistant Examiner*—Bret Hayes
(74) *Attorney, Agent, or Firm*—Donald R. Schooner

(57) ABSTRACT

A fishing rod includes one or more signal devices in a portion thereof and a power system that is connected to and activates the one or more signal devices when the fishing rod is flexed by a fish. The connection between the one or more signal devices and a power source includes a control switch and an activation switch that includes an electrically conductive pin mounted on the fishing rod and an electrically conductive coil spring surrounding the electrically conductive pin. The circuit between the one or more signal devices and the power is completed when the control switch is in the "on" condition and the electrically conductive pin and the electrically conductive coil of the activation switch are in electrical contact with each other. A kit may be used to retrofit an existing fishing rod.

8 Claims, 3 Drawing Sheets

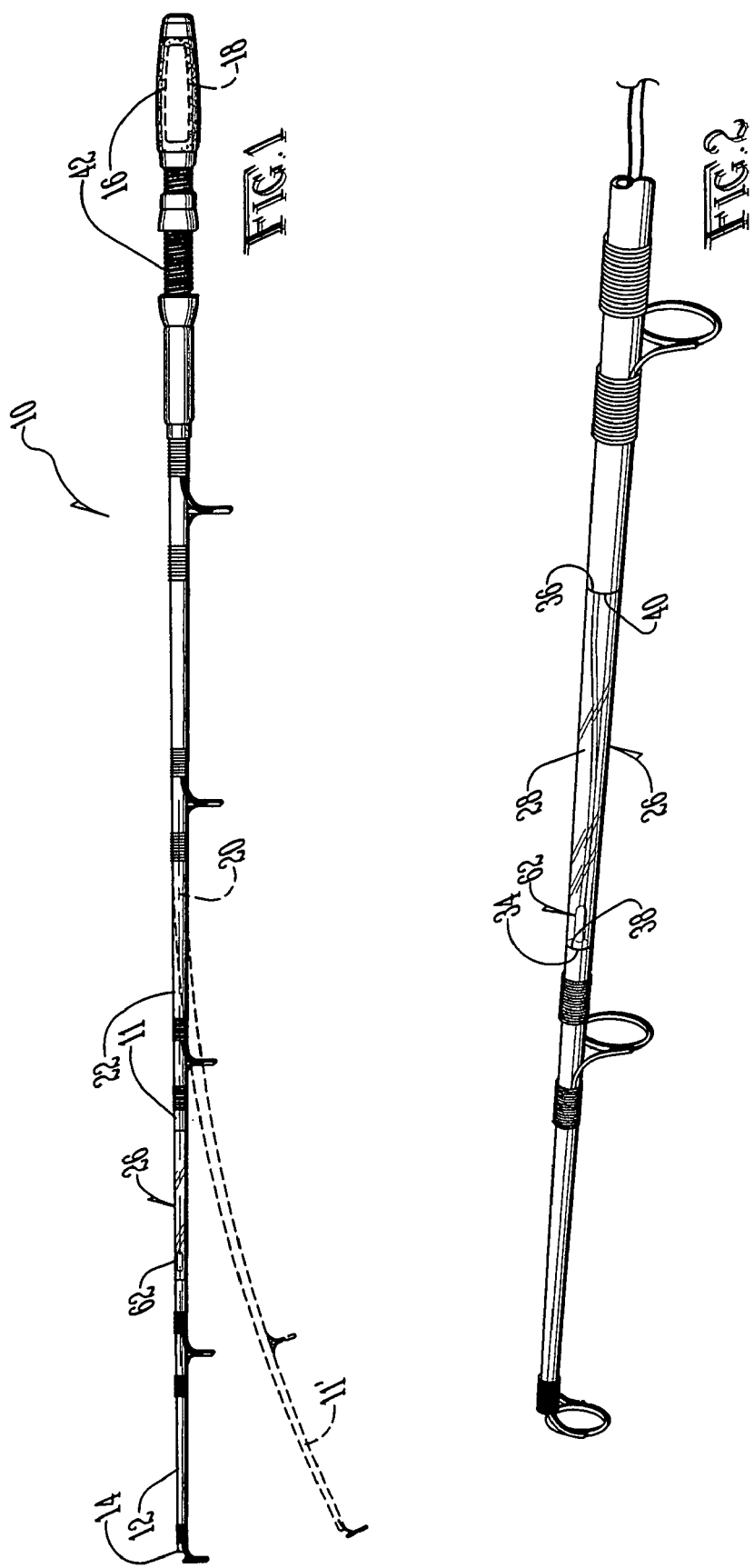

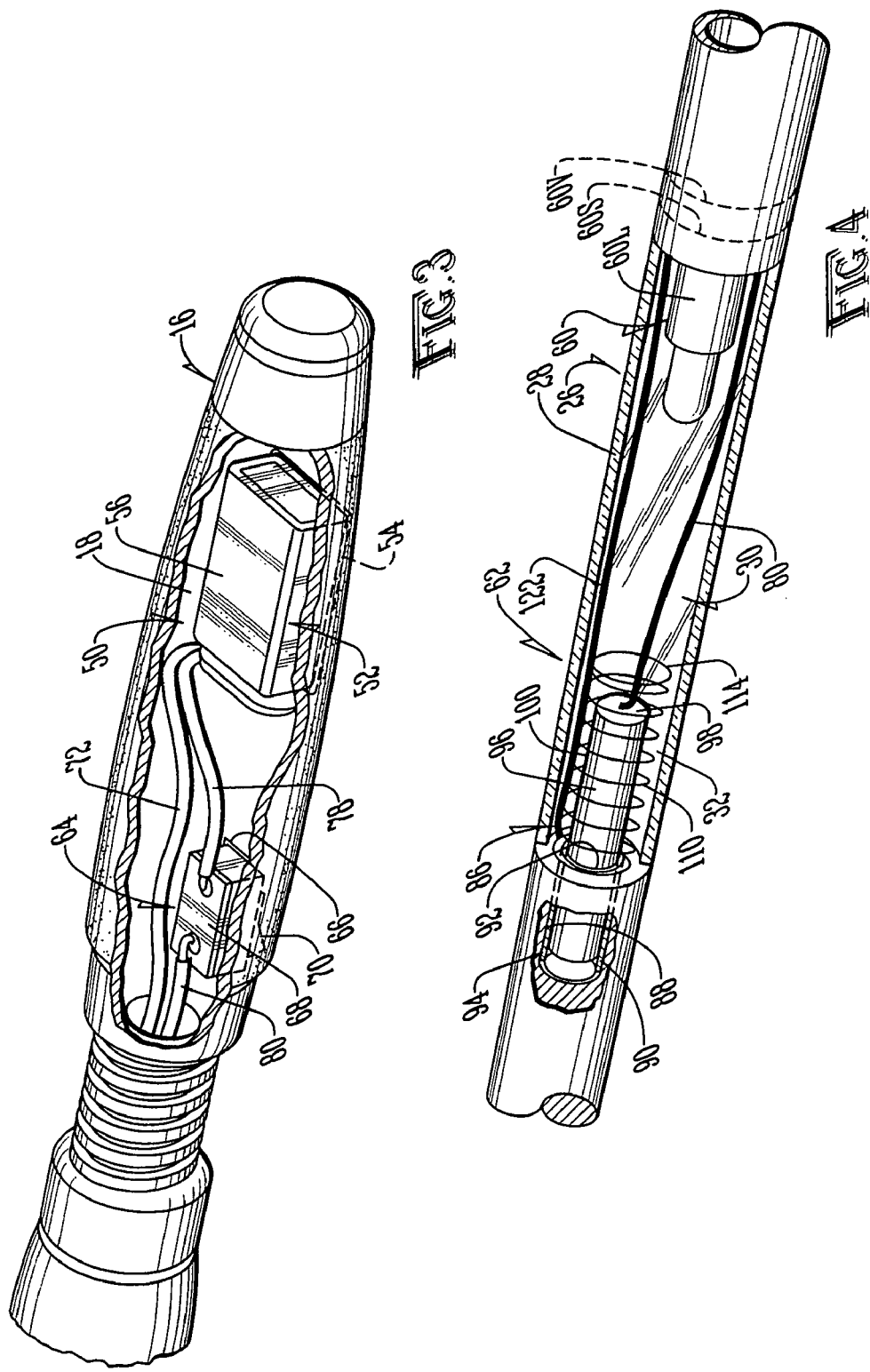

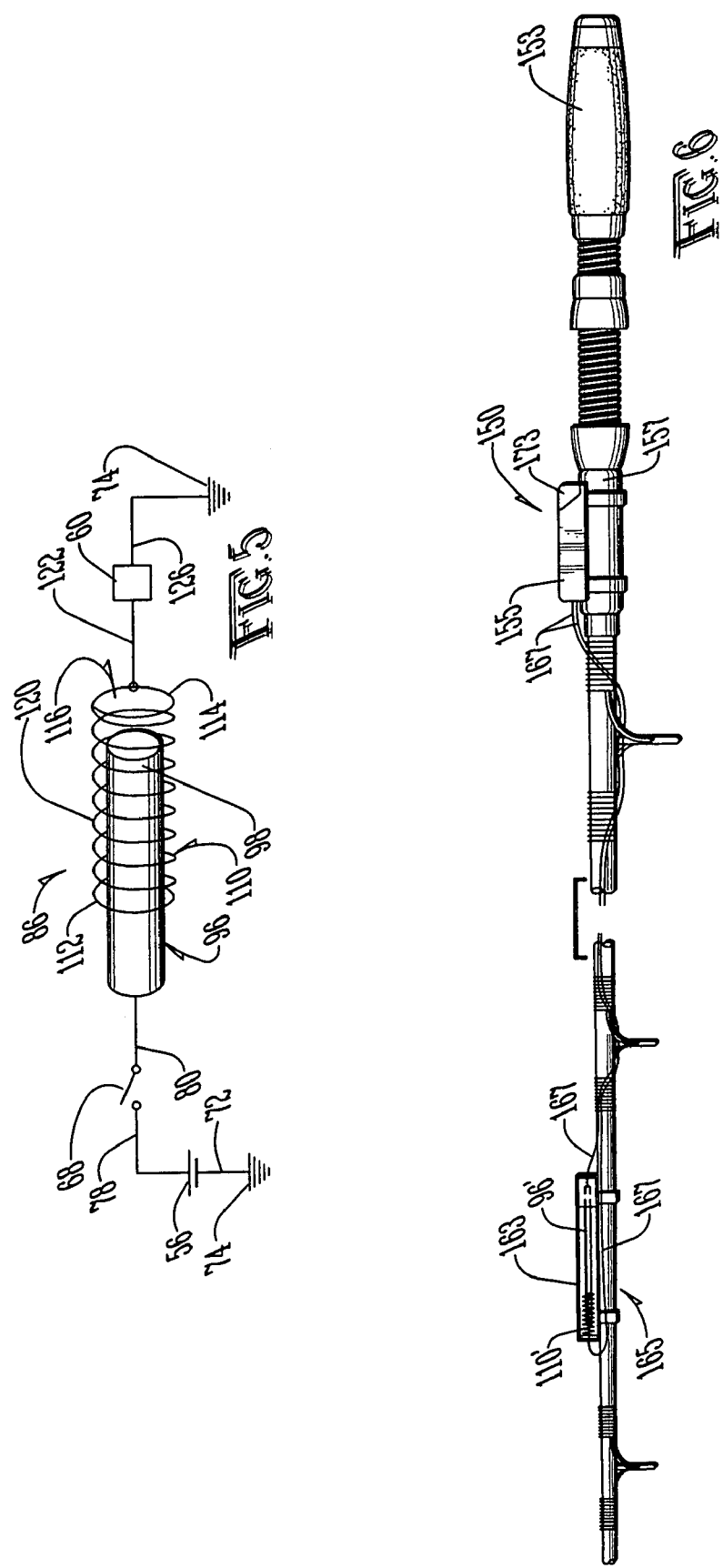

FISHING ROD WITH SIGNAL DEVICES ACTIVATED BY FISH-BITE FLEXING OF THE FISHING ROD

CROSS REFERENCE TO RELATED APPLICATIONS

This is a continuation-in-part of U.S. application Ser. No. 10/171,781 entitled "Fishing Rod with a Light Activated by Flexing of the Fishing Rod" and filed Jun. 17, 2002, now abandoned.

BACKGROUND OF THE INVENTION

1. Field of the Invention

The present invention relates to the general art of fishing, and to the particular field of fishing rods.

2. Discussion of the Related Art

Fishing is one of the most popular sports and pastimes in the United States, as well as in other countries. As such, the fishing art includes a multitude of devices and systems that are intended to make fishing more enjoyable, and more efficient. However, due to the popularity of the activity, there is always room for further improvements.

Fishing is often most efficient when conducted in low light conditions, such as at dawn or at dusk. Often, fishing occurs at night when there may be no light available to the fisherman other than moonlight. Furthermore, some fisherman may be visually impaired making it difficult if not impossible to see the tip of the rod even during high visibility conditions, and which may make it nearly impossible to see the tip of the rod with sufficient clarity to determine when a fish has taken the hook during low visibility conditions. In addition, many individuals who are unable to do so with available fishing gear because of various physical impairments.

As is well known, there is a most fortuitous time to move a rod in order to secure a hook in a fish. If the rod is moved too early or too late, the hook may not be properly set or the fish may actually be able to swim away. Many fisherman can tell by the feel of the rod when the proper time to set the hook occurs. However, due to environmental conditions, it may not always be possible to set a hook according to feel.

Therefore, there is a need for a fishing rod that provides a signal to a fisherman when a fishing rod should be moved to set a hook in a fish.

The fishing art contains many systems and devices for signaling a fisherman when a fish has taken the hook. However, the devices and systems known to the inventor are difficult to fit into a fishing rod and may require factory work for proper operation. This makes it difficult or expensive for a fisherman to adapt a fishing rod he or she already owns to have a fish-bite signalling capability. In fact, it may require that a fisherman purchase an entire rod just for night fishing.

Therefore, there is a need for a signal system that can be used with a fishing rod and which is simple to install on the fishing rod.

PRINCIPAL OBJECTS OF THE INVENTION

The principal objects and advantages of the present invention include: providing a fishing rod having at least one signal device that indicates when a fish bite is occurring; providing such a fishing rod that emits a visible signal when a fish bite is occurring; providing such a fishing rod that emits a audible signal when a fish bite is occurring; providing such a fishing rod that produces a vibrating signal when a fish bite is occurring; providing such a fishing rod that can be used at night; providing such a fishing rod that can be used by a visually-impaired individual; providing such a fishing rod that can be used by a hearing-impaired individual; providing a kit for converting an existing fishing device into such a fishing rod; and generally providing such a fishing rod that is reliable in performance, capable of long lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

SUMMARY OF THE INVENTION

These, and other, objects are achieved by a fishing rod that includes a battery compartment in the handle of the fishing rod and a signal section between the handle of the rod and the tip of the rod. A switch system electrically connects a battery in the battery compartment to one or more signal devices in the signal section and includes a control switch in the handle of the fishing rod as well as an activation switch in the signal section of the fishing rod. The activation switch includes an electrically conductive pin mounted on the fishing rod and a coil spring mounted to surround the electrically conductive pin. The coil spring is electrically connected to the one or more signal devices and the electrically conductive pin is electrically connected to the battery via the control switch.

When the control switch is in the "on" configuration, the one or more signal devices are connected to the battery when the fishing rod is flexed by a fish in a manner that produces electrical contact between the coil spring and the electrically conductive pin. The one or more signal devices are disconnected from the battery when the coil spring is electrically spaced apart from the electrically conductive pin. The coil spring and the electrically conductive pin are sized and spaced relative to each other so the pin is electrically spaced apart from the coil spring when the fishing rod is in an unflexed condition and the coil spring and the electrically conductive pin are in electrical contact with each other when the fishing rod is in a flexed condition.

For purposes of this disclosure, a "flexed" condition of the fishing rod is a condition assumed by the fishing rod when a fish strikes the bait and/or hook in a manner sufficient to properly hook the fish and the fishing rod is in an "unflexed" condition when either no fish strike occurs or when a nibble occurs or when a fish hits the hook and/or bait with force that is insufficient to capture the fish.

The one or more signal devices may include a light-emitting element, a sound-emitting element and/or a vibratory element which allows the fishing rod to be used in low light, at night with no light, or by a physically-impaired individual. The signal devices in the fishing rod will emit a signal to a fisherman that a fish has been properly hooked.

A fishing rod can be easily fitted or retrofit to include the signal system of the present invention.

BRIEF DESCRIPTION OF THE DRAWING FIGURES

FIG. 1 is a is a side elevational view of a fishing rod embodying the present invention.

FIG. 2 is a perspective view of a signal section of the fishing rod embodying the present invention.

FIG. 3 is an enlarged perspective view of a handle section of the fishing rod embodying the present invention with portions cut away to reveal details thereof.

FIG. 4 is a perspective view of an activation switch of the fishing rod embodying the present invention.

FIG. 5 is a schematic representation of a circuit used to electrically connect the elements of the signaling system of the fishing rod embodying the present invention.

FIG. 6 is a partially schematic, side elevational view of a kit retrofitting an existing fishing rod, according to the present invention.

DETAILED DESCRIPTION OF THE INVENTION

Other objects, features and advantages of the invention will become apparent from a consideration of the following detailed description and the accompanying drawings.

Referring to the Figures, it can be understood that the present invention is embodied in a fishing rod 10 which comprises a body unit 11 which includes a distal end 12 having a tip 14 and a handle end 16. The fishing rod 10 is formed of the usual materials and the handle end 16 is hollow and has a handle chamber 18 defined therein. Fishing rod 10 includes a body longitudinal axis 20 extending between the distal end 12 and the handle end 16 of the rod 10. Fishing rod 10 further includes a wall 22 extending between the distal end 12 and the handle end 16. Body unit 11 is flexible with respect to the body longitudinal axis 20 between a flexed condition, indicated in FIG. 1 by dotted lines 11', and an unflexed condition shown in solid lines in FIG. 1.

Body unit 11 further includes a signal section 26 located between the distal end 12 and the handle end 16. Signal section 26 includes a hollow bore 30 which extends in the direction of the body longitudinal axis 20, a chamber 32 in the hollow bore 30, a first end 34, and a second end 36 spaced from the first end 34 of the signal section 26 in the direction of the body longitudinal axis 20. A first wall 38 is located on the first end 34 of the signal section 26 and a second wall 40 is located on the second end 36 of the signal section 26.

Rod unit 10 includes a reel section 42 located between the handle section 16 and the signal section 26. Body unit 11 is hollow between the handle section 16 and the signal section 26.

Rod unit 10 further includes a power system 50 which includes a battery section 52 defined in the wall 22 of the body unit 11 and which includes an opening 54 through the wall 22 of the body unit 11 in the handle section 16 of the body unit 11 and a battery 56 releasably mounted on the wall 22 of the body unit 11 adjacent to the opening 54 of the battery section 52.

The rod unit 10 further includes one or more signal devices 60 as hereinafter described. For example, in applications of the present invention wherein the one or more signal devices 60 includes a light-emitting device 60$_L$, the signal section 26 includes a translucent wall section 28 and the light-emitting element 60$_L$ is mounted on the second wall 40 of the signal section 26. Light-emitting element 60$_L$ can include any suitable light bulb. Similarly, in applications wherein the one or more signal devices 60 includes a buzzer, beeper or other sound-emitting device 60$_s$ and/or a vibratory element 60$_v$, those elements may be mounted near the signal section 26, as schematically indicated in FIG. 4, and/or in the handle end 16, as desired.

Rod unit 10 further includes an activation system 62 which includes a control switch section 64 defined in the wall 22 of the body unit 11 and which includes an opening 66 through the wall 22 of the body unit 11 in the handle section 16 of the body unit 11. The control switch section 64 is spaced apart from the battery section 52 in the direction of the longitudinal axis 20 of the body unit 11. A control switch 68 is mounted on the wall 22 of the body unit 11 adjacent to the opening 66 of the control switch section 64. The control switch 68 is movable between an "on" configuration and an "off" configuration and has a switch lever 70 located outside the chamber 18 defined in the handle end 16 of the body unit 11.

A first electrical conductor 72 electrically connects the battery 56 to a common ground conductor 74, a second electrical conductor 78 electrically connects the battery 56 to the control switch 68, and a third electrical conductor 80 is electrically connected to the control switch 68 for a purpose that will be understood from the teaching of the following disclosure.

The activation system 62 further includes an activation switch 86 located in the signal section 26 of the body 11. Activation switch 86 includes a mounting bore 88 defined in the first wall 38 of the signal section 26. The mounting bore 88 extends in the direction of the body longitudinal axis 20. A mounting tube 90 is located in the mounting bore 88 and includes a proximal end 92 in the mounting bore 88 and a distal end 94 located outside of the mounting bore 88. An electrically conductive pin 96 is fixedly mounted in the mounting tube 90 and includes a distal end 98 which is located outside of the mounting tube 90. The electrically conductive pin 96 has an outer diameter 100. The third electrical conductor 80 electrically connects the electrically conductive pin 96 to the control switch 68.

Activation system 62 further includes a coil spring 110 located in the signal section 26. Coil spring 110 includes a first end 112 fixedly mounted on the first wall 38 of the signal section 26 and a second end 114 spaced from the first end 112 of the coil spring 110 in the direction of the body longitudinal axis 20. Coil spring 110 further includes a spring bore 116 defined between the first end 112 of the coil spring 110 and the second end 114 of the coil spring 110. The coil spring 110 is formed of material that is electrically conductive. The coil spring 110 is mounted to surround the electrically conductive pin 96 with the electrically conductive pin 96 located in the spring bore 116 and extending from adjacent to the first end 112 of the coil spring 110 toward the second end 114 of the coil spring 110.

The coil spring 110 has a diameter 120 measured at the spring bore 116. Diameter 120 of the coil spring 110 is greater than the outer diameter 100 of the electrically conductive pin 96. As can be understood from the teaching of this disclosure, the electrically conductive pin 96 will be spaced apart from the coil spring 110 when the body unit 11 is in an unflexed condition. The coil spring 110 is sized and located with respect to the electrically conductive pin 96 to be in electrical contact with the electrically conductive pin 96 when the body unit 11 is in a flexed condition.

The rod unit 10 further includes a fourth electrical conductor 122 electrically connecting the one or more signal devices 60 to the coil spring 110 and a fifth electrical conductor 126 electrically connecting the one or more signal devices 60 to the common ground conductor 74.

Operation of the rod unit 10 will be understood by those skilled in the art based on the teaching of the above description. When the rod unit 10 is in an unflexed condition, the electrically conductive pin 96 is spaced apart from the electrically conductive coil spring 110 and the circuit shown in FIG. 5 is open, even if the control switch 68 is in an "on" condition. However, if the control switch 68 is in an "on" condition and the fishing rod 10 is flexed (as indicated by dotted lines 11' in FIG. 1) sufficiently to hook a fish, the electrically conductive coil spring 110 will make contact with the electrically conductive pin 96 thus completing the circuit shown in FIG. 5 and electrically connecting the one or more signal devices 60 to the power source 50 to activate the one or more signal devices 60 and produce a corresponding visible, audible and/or vibratory signal. The visible, audible and/or vibratory signal will remain on as long as the control switch 68 is in the "on" condition and the rod 10 remains flexed sufficiently to bring the electrically conductive pin 96 and the electrically conductive coil 110 into electrical contact with each other. As soon as either the control switch 68 is moved into the "off" condition or the electrically conductive pin 96 is electrically spaced apart from the electrically conductive coil 110, the one or more signal devices 60 will be deactivated.

The present invention may be used as a kit 150 to retrofit an existing fishing rod 153. In such an embodiment 150, the various components as hereinbefore described, with the exception of the electrically conductive pin 96' and the coil spring 110', are mounted in a first container 155 attached to a rear portion 157 of the existing rod 153 in a manner and location that is non-intrusive to the user. The electrically conductive pin 96' and the coil spring 110' are mounted forwardly in a second container 163 mounted on a flexing portion 165 of the rod 153 (shown schematically in FIG. 6) whereby the conductive pin 96' and coil spring 110' are in electrical contact when the flexing portion 165 of the rod 153 is in a flexed condition but are not in electrical contact when the flexing portion 165 of the rod 153 is in an unflexed condition. Electrical conductors 167 connect the conductive pin 96' and coil spring 110' to the components in the first container 155 as hereinbefore described. The first container 155 has a translucent or transparent portion 173 through which light is transmitted by a light-emitting element thereof when the activation system of the present invention is activated. It is to be understood that the kit 150 of the present invention may include one or more signal devices, including a light-emitting element, a sound-emitting element and/or a vibratory element, as hereinbefore described.

It is understood that while certain forms of the present invention have been illustrated and described herein, it is not to be limited to the specific forms or arrangements of parts described and shown.

What is claimed is:

1. A fishing rod comprising:
 a) a body unit which includes
   (1) a distal end having a tip,
   (2) a handle end, the handle end being hollow and having a handle chamber defined therein,
   (3) a body longitudinal axis extending between the distal end and the handle end,
   (4) a wall extending between the distal end and the handle end, said body unit being flexible with respect to the body longitudinal axis between a flexed configuration and an un-flexed configuration,
   (5) a signal section between the distal end and the handle end, the signal section including
     (A) a translucent wall section,
     (B) a hollow bore which extends in the direction of the body longitudinal axis,
     (C) a chamber in the hollow bore,
     (D) a first end,
     (E) a second end spaced from the first end of the signal section in the direction of the body longitudinal axis,
     (F) a first wall on the first end of the signal section, and
     (G) a second wall on the second end of the signal section,
   (6) a reel section located between the handle end and the signal section, and
   (7) said body unit being hollow between the handle end and the signal section;
 b) a power system which includes
   (1) a battery section defined in the wall of said body unit and which includes an opening through the wall of said body unit in the handle end of said body unit, and
   (2) a battery releasably mounted on the wall of said body unit adjacent to the opening of the battery section;
 c) a light element in the signal section and which is mounted on the first wall of the signal section;
 d) a light control system which includes
   (1) a main on/off switch section defined in the wall of said body unit and which includes an opening through the wall of said body unit in the handle end of said body unit, the main on/off switch section being spaced apart from the battery section in the direction of the longitudinal axis of said body unit,
   (2) a main on/off switch mounted on the wall of said body unit adjacent to the opening of the main on/off switch section, the main on/off switch being movable between an "on" configuration and an "off" configuration and having a switch lever located outside the chamber defined in the handle end of said body unit,
   (3) a first electrical conductor electrically connecting the battery to ground,
   (4) a second electrical conductor electrically connecting the battery to the main on/off switch,
   (5) a third electrical conductor electrically connected to the main on/off switch,
   (6) an activation switch located in the signal section of said body unit and including
     (A) a mounting bore defined in the first wall of the signal section and which extends in the direction of the body longitudinal axis,
     (B) a mounting tube in the mounting bore and which includes a proximal end in the mounting bore and a distal end located outside of the mounting bore,
     (C) an electrically conductive pin fixedly mounted in the mounting tube and which includes a distal end that is located outside of the mounting tube, the electrically conductive pin having an outer diameter,
     (D) the third electrical conductor electrically connecting the electrically conductive pin to the main on/off switch,
     (E) a coil spring located in the signal section and which includes
       (i) a first end fixedly mounted on the first wall of the signal section,
       (ii) a second end spaced from the first end of the coil spring in the direction of the body longitudinal axis,
       (iii) a spring bore defined between the first end of the coil spring and the second end of the coil spring, and
       (iv) the coil spring being electrically conductive, (F) the coil spring being mounted to surround the electrically conductive pin with the electrically conductive pin being located in the spring bore and extending from adjacent to the first end of the coil spring toward the second end of the coil spring, (G) the coil spring having a diameter measured at the spring bore, the diameter of the coil spring being greater than the outer diameter of the electrically conductive pin with the electrically conductive pin being spaced apart from the coil spring when said body unit is in the unflexed configuration, the coil spring being sized and located with respect to the electrically conductive pin to be in electrical contact with the electrically conductive pin when said body unit is in the flexed configuration, (H) a fourth electrical conductor electrically connecting the light element to the coil spring, and (I) a fifth electrical conductor electrically connecting the light element to ground; and e) wherein the light element is activated by flexing of the electrically conductive pin and the coil spring relative to each other whereat electrical contact is made therebetween when the fishing rod is in any orientation including vertically upward as a fish flexes the fishing rod.

2. A fishing rod comprising:
a) a flexible body having a hollow bore defined therein;
b) a handle section on one end of said flexible body;
c) a tip section on a second end of said flexible body;
d) a translucent section between said handle section and said tip section;
e) a light in said translucent section;
f) a battery in said handle section;
g) a main on/off switch in said handle section;
h) an activation switch located in said translucent section and which includes
  (1) an electrically conductive pin, and
  (2) an electrically conductive coil spring surrounding the electrically conductive pin;
i) an electrical conductor system which includes
  (1) a first electrical conductor electrically connecting said battery to ground,
  (2) a second electrical conductor electrically connecting said battery to said main on/off switch,
  (3) a third electrical conductor electrically connecting said main on/off switch to said electrically conductive pin,
  (4) a fourth electrical conductor electrically connecting said coil spring to said light, and
  (5) a fifth electrical conductor electrically connecting said light to ground;
j) said flexible body being movable between a flexed condition and an unflexed condition; and
k) said coil spring and said electrically conductive pin being sized and positioned with respect to each other so said electrically conductive pin is in electrical contact with said coil spring when said flexible body is in the flexed condition and the electrically conductive pin is electrically spaced apart from said coil spring when said flexible body is in the unflexed condition; and
l) wherein the light is activated by flexing of the electrically conductive pin and the electrically conductive coil spring relative to each other whereat electrical contact is made therebetween when the fishing rod is in any orientation including vertically upward as a fish flexes the fishing rod.

3. A fishing rod comprising:
a) a flexible body unit having a first end and a second end, wherein the body unit is movable to and from a flexed condition and an unflexed condition;
b) a handle end on the first end of the body unit;
c) a tip portion on the second end of the body unit;
d) at least one signal device;
e) a battery in the handle end;
f) a control switch;
g) an activation switch including:
  (1) an electrically conductive pin, and
  (2) an electrically conductive coil spring surrounding the electrically conductive pin;
h) an electrical system including:
  (1) a first electrical conductor electrically connecting the battery to a common ground conductor,
  (2) a second electrical conductor electrically connecting the battery to the control switch,
  (3) a third electrical conductor electrically connecting the control switch to the electrically conductive pin,
  (4) a fourth electrical conductor electrically connecting the coil spring to the at least one signal device, and
  (5) a fifth electrical conductor electrically connecting the at least one signal device to the common ground conductor; and
i) wherein the coil spring and the electrically conductive pin are sized and positioned with respect to each other so the pin is in electrical contact with the coil spring when the body unit is in the flexed condition and is positioned in any orientation including upright, upside down, sidewise, vertically upward, or vertically downward as a fish flexes the fishing rod, and wherein the electrically conductive pin is electrically spaced apart from and not in electrical contact with the coil spring when the body unit is in the unflexed condition and is positioned in any orientation including upright, upside down, sidewise, vertically upward, or vertically downward.

4. The fishing rod as described in claim 3, wherein the at least one signal device includes a light-emitting element that is activated when the coil spring and the electrically conductive pin are in electrical contact with each other when the body unit is in the flexed condition and is positioned in any orientation including upright, upside down, sidewise, vertically upward, or vertically downward as a fish flexes the fishing rod, and wherein the light-emitting element is not activated when the coil spring and the electrically conductive pin are spaced apart from and not in electrical contact with each other when the body unit is in the unflexed condition and is positioned in any orientation including upright, upside down, sidewise, vertically upward, or vertically downward.

5. The fishing rod as described in claim 3, wherein the at least one signal device includes a sound-emitting element that is activated when the coil spring and the electrically conductive pin are in electrical contact with each other when the body unit is in the flexed condition and is positioned in any orientation including upright, upside down, sidewise, vertically upward, or vertically downward as a fish flexes the fishing rod, and wherein the sound-emitting element is not activated when the coil spring and the electrically conductive pin are spaced apart from and not in electrical contact with each other when the body unit is in the unflexed condition and is positioned in any orientation including upright, upside down, sidewise, vertically upward, or vertically downward.

6. The fishing rod as described in claim 3, wherein the at least one signal device includes a vibratory element that is activated when the coil spring and the electrically conductive pin are in electrical contact with each other when the body unit is in the flexed condition and is positioned in any orientation including upright, upside down, sidewise, vertically upward, or vertically downward as a fish flexes the fishing rod, and wherein the vibratory element is not activated when the coil spring and the electrically conductive pin are spaced apart from and not in electrical contact with each other when the body unit is in the unflexed condition and is positioned in any orientation including upright, upside down, sidewise, vertically upward, or vertically downward.

7. The fishing rod as described in claim 3, wherein the at least one signal device includes one or more of the set of signal devices comprising a light-emitting element, a sound-emitting element and a vibratory element, each of which is activated when the coil spring and the electrically conductive pin are in electrical contact with each other when the body unit is in the flexed condition and is positioned in any orientation including upright, upside down, sidewise, vertically upward, or vertically downward as a fish flexes the fishing rod, and wherein each of the one or more signal devices is not activated when the coil spring and the electrically conductive pin are spaced apart from and not in electrical contact with each other when the body unit is in the unflexed condition and is positioned in any orientation including upright, upside down, sidewise, vertically upward, or vertically downward.

8. A fishing rod comprising:
  a) a body unit with a wall and having:
    (1) a distal end with a tip,
    (2) a handle end with a handle chamber therein,
    (3) a body longitudinal axis extending between the distal end and the handle end,
    (4) an intermediate member extending between the distal end and the handle end and being flexible relative to the body longitudinal axis between a flexed condition and an unflexed condition,
    (5) a signal unit spaced between the distal end and the handle end and having a first wall and a second wall, wherein the signal unit includes
      (A) a translucent wall portion,
      (B) a signal cavity which extends in the direction of the body longitudinal axis, and
      (C) a chamber in the signal cavity having a first end and a second end spaced apart from the first end in the direction of the body longitudinal axis,
    (6) a reel section located between the handle end and the signal unit, and
    (7) said intermediate member being hollow between the handle end and the signal unit;
  b) a power system which includes
    (1) a battery section defined in the wall of the body unit and which includes an opening through the wall of the body unit in the handle end, and
    (2) a battery releasably mounted on the wall of the body unit adjacent to the opening of the battery section;
  c) at least one signal device from the set consisting of a light-emitting element, a sound-emitting element and a vibratory element, the at least one signal device mounted near the second wall of the signal unit;
  d) a signal control system which includes
    (1) a control switch section defined in the wall of the body unit and which includes an opening through the wall of the body unit in the handle end of the body unit, the control switch section being spaced apart from the battery section in the direction of the longitudinal axis of the body unit,
    (2) a control switch mounted on the wall of the body unit adjacent to the opening of the control switch section, the control switch being movable between an "on" configuration and an "off" configuration and having a switch lever located outside the chamber defined in the handle end of the body unit,
    (3) a first electrical conductor electrically connecting the battery to a common ground conductor,
    (4) a second electrical conductor electrically connecting the battery to the control switch,
    (5) a third electrical conductor electrically connected to the control switch,
    (6) an activation switch located in the signal unit of the body unit and including
      (A) a mounting bore defined in the first wall of the signal unit and which extends in the direction of the body longitudinal axis,
      (B) a mounting tube in the mounting bore and which includes a proximal end in the mounting bore and a distal end located outside of the mounting bore,
      (C) an electrically conductive pin fixedly mounted in the mounting tube and which includes a distal end that is located outside of the mounting tube, the electrically conductive pin having an outer diameter,
      (D) the third electrical conductor electrically connecting the electrically conductive pin to the control switch,
      (E) a coil spring located in the signal unit and which includes
        (i) a first end fixedly mounted on the first wall of the signal unit,
        (ii) a second end spaced from the first end of the coil spring in the direction of the body longitudinal axis,
        (iii) a spring bore defined between the first end of the coil spring and the second end of the coil spring, and
        (iv) the coil spring being electrically conductive,
      (F) the coil spring being mounted to surround the electrically conductive pin with the electrically conductive pin being located in the spring bore and extending from adjacent to the first end of the coil spring toward the second end of the coil spring, and
      (G) the coil spring having a diameter measured at the spring bore, the diameter of the coil spring being greater than the outer diameter of the electrically conductive pin with the electrically conductive pin being spaced apart from the coil spring when the intermediate member is in the unflexed condition, the coil spring being sized and located with respect to the electrically conductive pin to be in electrical contact with the electrically conductive pin when the intermediate member is in the flexed condition,
    (7) a fourth electrical conductor electrically connecting the one or more signal devices to the coil spring, and
    (8) a fifth electrical conductor electrically connecting the one or more signal devices to the common ground conductor; and
  e) wherein the at least one signal device is activated when the coil spring and the electrically conductive pin are in electrical contact with each other when the intermediate member is in the flexed condition and is positioned in any orientation including upright, upside down, sidewise, vertically upward, or vertically downward as a fish flexes the fishing rod, and wherein the at least one signal device is not activated when the coil spring and the electrically conductive pin are spaced apart from and not in electrical contact with each other when the intermediate member is in the unflexed condition and is positioned in any orientation including upright, upside down, sidewise, vertically upward, or vertically downward.

* * * * *